United States Patent
Weismantel

(10) Patent No.: US 8,126,775 B1
(45) Date of Patent: Feb. 28, 2012

(54) METHOD AND SYSTEM FOR TRANSMITTAL OF EXTENDED DATA ATTRIBUTES FOR PRODUCT ITEMS, PRICING AND TRADE PROMOTION TRANSACTIONS

(75) Inventor: Gregory N. Weismantel, Saint Charles, IL (US)

(73) Assignee: JDA Software Group, Inc., Scottsdale, AZ (US)

( * ) Notice: Subject to any disclaimer, the term of this patent is extended or adjusted under 35 U.S.C. 154(b) by 3851 days.

(21) Appl. No.: 10/053,935

(22) Filed: Jan. 24, 2002

(51) Int. Cl.
*G06Q 30/00* (2006.01)
(52) U.S. Cl. .................................. 705/14.73; 705/14.4
(58) Field of Classification Search ............... 705/14.73, 705/14.4
See application file for complete search history.

(56) References Cited

U.S. PATENT DOCUMENTS

| | | | |
|---|---|---|---|
| 5,394,546 A | 2/1995 | Hanatsuka | |
| 6,125,391 A * | 9/2000 | Meltzer et al. | 709/223 |
| 6,289,382 B1 * | 9/2001 | Bowman-Amuah | 709/226 |
| 6,993,506 B2 * | 1/2006 | Jain et al. | 705/39 |
| 2002/0035488 A1 * | 3/2002 | Aquila et al. | 705/4 |
| 2002/0049790 A1 * | 4/2002 | Ricker et al. | 707/513 |
| 2002/0052862 A1 * | 5/2002 | Scott et al. | 707/1 |

OTHER PUBLICATIONS

The Vista Technology Group, Ltd., VistaRetail User's Guide, Oct. 11, 2001.
The Vista Technology Group, Ltd., *VistaSupply User's Guide*, Jun. 26, 2001.

* cited by examiner

*Primary Examiner* — Michael Bekerman
(74) *Attorney, Agent, or Firm* — Booth Udall, PLC; Steven J. Laureanti

(57) ABSTRACT

A method and system that facilitates communication between demand and supply side trading partners of the consumer goods industry in the electronic transmittal of extended data attributes for product items, pricing and trade promotions. The method includes the steps of establishing a connection to a program, which provides for the definition and establishment of extended data attributes specific to the user. The method also includes inputting extended data into the program and outputting the information to a designated trading partner in the form of an XML-based message as communicated through the Internet. The system incorporates the transmittal of the extended data attribute information by attaching it to a standards-based determined transaction message for item introduction, pricing and promotions, thus allowing ease of integration of both standards-based and extended data attribute information on product items, pricing and promotions to trading partners' respective ERP or legacy systems.

23 Claims, 10 Drawing Sheets

| Data Manipulation for extenddefinition | | | | | | |
|---|---|---|---|---|---|---|
| Extenddefinitionid | Name | Datatypeid | Description | Length | Entitytypeid | Req | Tpid |
| 4 | Max Temp | 2 | maximum temperature | 0 | 5 | Y | |
| 2 | Boiling Point | 2 | boiling point of liquid | 0 | 1 | Y | |
| 1 | Tare Weight | 2 | Tare weight | 0 | 1 | Y | |
| 3 | Stackable Height | 2 | Stackable Height | 0 | 1 | Y | |
| 7 | Freezing Point | 2 | new and improved 2 | 0 | 1 | N | |
| 5 | Freezer Temperature | 2 | Freezer Temperature | 0 | 1 | Y | |
| 11 | Flash Point | 3 | new and improved 2 | 0 | 1 | Y | |
| 21 | Min Temp | 3 | for date | 0 | 1 | N | |
| 25 | Product Freezing Point | 2 | Product Freezing Point for product Category | 0 | 4 | Y | 1 |
| 26 | Product Boiling Point | 2 | Product Boiling Point for product category | 0 | 4 | Y | 1 |
| 27 | Alcohol Content | 2 | The Alcohol Content in Percent | 0 | 1 | N | 1 |
| 28 | Max Alchol Content | 2 | | 0 | 1 | N | 1 |
| 31 | Net Color | 1 | the net color of an item reqd | 50 | 1 | N | 1 |
| 29 | $ per ounce | 2 | cents per ounce | 0 | 1 | Y | 1 |
| 30 | Max Alcohol Content | 1 | Max Alcohol Content | 100 | 4 | N | 1 |
| 32 | Min Alcohol Content | 2 | The minimum amount of Alcohol | 0 | 1 | N | 1 |
| 33 | Iron Content | 1 | How much iron in the product | 25 | 1 | Y | 1 |

FIG. 4A

Data Manipulation for extenddatatype

| Extenddatatypeid | Name | Description |
|---|---|---|
| 1 | STRING | TEXT OF VARIOUS LENGTHS |
| 2 | NUMBER | NUMERIC |
| 3 | DATE | DATE DATATYPE |

FIG. 4B

Data Manipulation for extendentitytype

| Extendentitytypeid | Name |
|---|---|
| 1 | ITEM |
| 2 | PROMO |
| 3 | PRICE |

FIG. 4C

| EXTENDVALUES: Table(EVISTARETAIL_DEV) | | | |
|---|---|---|---|
| EXTENDVALUESID | DEFINITIONID | VALUE | ENTITYID |
| 39 | 2 | 100C | 296 |
| 40 | 2 | 23 23 65 | 671 |
| 41 | 4 | 5 | 689 |
| 1 | 1 | 36 lbs | 561 |
| 2 | 5 | −15F | 561 |
| 42 | 4 | 986566 | 690 |
| 43 | 2 | 6 | 690 |
| 44 | 1 | 65 | 690 |
| 45 | 3 | 56 | 690 |
| 46 | 7 | 5 | 690 |
| 37 | 4 | extra | 531 |
| 47 | 5 | 56 | 690 |
| 48 | 11 | 56 | 690 |

Vista Retail — ABC Foods

| Messages | Categories | Publications | Setup | Trading Partner | Org Units | Tools | Logout |

Extended Data Maintenance – Add, Update — 501

[Add New]  502

Change sort entity type: [ITEM] [X]

| Name | | Length | Description | Required |
|------|---|--------|-------------|----------|
| Alcohol Content | STRING | 12 | Alcohol Content | Y |
| Boiling Point | NUMBER | 0 | Boiling Point Of Liquid | Y |
| Max Temp | NUMBER | 0 | Maximum Temperature | Y |

| Messages | Categories | Publications | Setup | Trading Partner | Org Units | Tools | Logout |

Vista SA – Publication

Create New Publication — 601
View Publications
View My Kiosk Items

Add New

| ID | Type | Trading Partner | Date Created | Date Published | Status | Delete |
|----|------|-----------------|--------------|----------------|--------|--------|
| 424 | New Item Publication | Vista SA | 10/15/2001 3:13:22 PM | Not Published | Pending Submittal | ☒ |
| 427 | New Item Publication | Vista SA | 10/17/2001 2:46:29 PM | Not Published | Pending Submittal | ☒ |

Vista Retail — ABC Foods

Messages | Categories | Publications | Setup | Trading Partner | Org Units | Tools | Logout

Vista SA - Publication 430

To create new items,
Select Product Category...
Categories: [CHILLED / REFRIGERAT] [X]  — 604

Item Attributes
[ Basic ] [ Extended ]  — 605

Publication
GTIN: [561234567891O1]     Category:
Name: [Vista Berry Juice]   Ref. ID:
UPC:  [555123456789]        UPC Type: [--]▷

Dates — 606
First Order: [10/1/2001]    Last Order:   [11/1/2001]
First Ship:  [10/4/2001]    Last Ship:    [11/6/2001]
First Arrival:[10/6/2001]   Last Arrival: [10/9/2001]

Ordering — 607
Increment: [4]              Orderable: ●Yes ○No
Min Ship:  [25]             Max Ship:  [100]
Min Order: [25]             Max Order: [100]

Dimensions — 608
Height: [10] [cm]▷          Prod Type: [--]▷
Length: [25]                Rack:       [6]
Width:  [5]                 Inner Pack: [4]
Volume: [60] [cc]▷          Pallet Hi:  [4]
Net Weight: [12] [oz]▷      Pallet Ti:  [1]
Gross Wt:   [1]             Size UOM:   [4] [CA]▷

All basic form fields are required — 609

[Cancel]  [Save]

METHOD AND SYSTEM FOR TRANSMITTAL OF EXTENDED DATA ATTRIBUTES FOR PRODUCT ITEMS, PRICING AND TRADE PROMOTION TRANSACTIONS

BACKGROUND OF THE INVENTION

In today's marketplace, the consumer goods industry has seen a significant shift in the way it does business, primarily as a result of the Internet and electronic commerce. With traditional grocery items moving to large retail discount stores, such as Wal-Mart™ or Super K Center™, nation-wide supermarket chains, warehouse clubs and even boutique/specialty type food stores (organic, gourmet items), not only do consumers have more choices as to what products to choose, but also where to shop from. Accordingly, customer retention becomes top priority for these retailers. The focus to keep shelves well stocked, maintain a variety of product selections and offer a wide array of promotion incentives, has altered the manner in which the retailer and the manufacturer do business. The need to directly address front-end efforts and improve communication between the manufacturer (supply side trading partner) and retailer (demand side trading partner) is now of critical importance to doing business and keeping a known presence in this competitive market.

As evidenced in the past few years, electronic commerce, essentially business-to-business communication and processes have stepped up to the plate to answer this call. One mode of such communication is through electronic data interchange (EDI), which is data comprised of transaction sets, transmitted either through third party services or Value-Added Networks (VANs). Essentially, EDI facilitates the direct feed of data from computer to computer—transmitting transactions into vendors' databases which in turn feed to ordering, accounts payable systems. The EDI transaction sets are the necessary formats or templates specific to a purchase order, invoice, advance ship notice, product registration and the like. While this direct exchange of transaction sets is inviting, there are complexities associated with its use that have implicating cost factors as well. Essentially each manufacturer and retailer has its own applications and independent computer systems, each with requisite standards for accepting data. To utilize EDI, numerous interfaces must be developed to link the information to the particular sending or receiving-end party's software applications and computer systems. The software designed to support and develop such interfaces alone are costly. And in the instance of the Value Added Networks (VANs) which accommodate for such interfaces and parlay that information for the subscribing customer, these too can be cost prohibitive as higher transaction fees are assessed on each end of the line. Transaction fees rapidly accumulate as fees are charged when a message sent, received, re-sent with additional information, and approved or rejected.

With the emergence of the Internet, more progress has been made with respect to collaboration on the web. As an alternative mode of communication, the focus has moved to an Extensible Markup Language (XML)-based standard which allows the same fundamental communication of data as offered by EDI, however at a lesser cost. In addition, to further facilitate web-based transactions, the consumer goods industry has also turned to a standards-based organization in an effort to synchronize information and provide guidelines and protocols for all trading partners to communicate. Here, the standards-based organization amasses the information and works with a panel of industry representatives to set forth the required fields, or basic information, and exchange protocols which it deems essential in the consumer goods transaction process beginning with a new item's publication, its pricing, and following through to its associated trade-promotions. By having a standards-based format for the structure of the data and fields of information, supply side and demand side trading partners are readily able to communicate valid and essential information, which in turn can be passed through to their respective applications and integrated to their own Enterprise Resource Planning (ERP) or legacy systems.

Where the above process stops short is that this basic or standardized data is not the only mission-critical data that is required to complete a collaborative transaction. In the example of publishing an item, price, or promotion across the Internet, the only elements transmitted may be the Global Transaction Identification Number (GTIN), Item name, Price, Deal Rate, UPC code, First Order and Shipment Dates, Last Order and Shipment Dates, Performance Dates, the dimensions and qualifications of the Unit of Measure. The other mission-critical data in these transactions are extended data attributes, as to the product, price, or the promotion's more specific qualities, which is also required by the trading partners to facilitate a complete transaction. Although each trading partner may have different expectations of such data depending on the account, the category of the product, the extended attributes can be generally described as any other supplemental information which facilitates the transaction. It is only with the inclusion of this extended data that truly allows a true machine-to-machine transaction. Otherwise, it is necessary for the trading partner to employ raw labor to define and populate such extended data to accommodate the complete transaction.

The uniqueness of this extended data is not new. The consumer goods industry has traditionally run its business, both on the retail and manufacturer's side through printed contracts or trade forms for promotions. Like most paper-driven processes, these forms were extremely thorough with extensive detail from the product description, size, dates, pricing, merchandising activity, and payment thereof. However, obviously, with its static form it had to be routed through various departments, keyed into different systems, all the while subject to human error. Numerous techniques, including the presence of EDI, Consortia Exchanges, and the Internet with XML-based messaging have vastly improved the former paper process; however, the specifics of the industry and particulars of each retail account still dictate how business is conducted. While standards have been created to facilitate this electronically, and exchanges and catalog databases maintain the various item requisites, there still remains a void with respect to this relevant data the retailer needs to feed to its own legacy system to keep its operations running on a machine-to-machine basis.

As noted above, it is understood that each demand side trading partner will have different extended data attributes required for items, pricing and promotion. Without such a method to accommodate both electronic standard item attributes as well as extended data, machine-to-machine transactions without input from human hands is impossible. Because there are no universally agreed or standard default extended data attributes, it is important these fields are created by the respective retailer as defined by their business practice and/or item category specifications. What is considered of importance in selling chemical-based house cleaners, such as the "Flash Point" (the lowest temperature at which vapor or volatile liquid will ignite when heated under standard conditions) is different from the extended data requisite for frozen pizzas, essentially the "Freezer Temperature" to indicate the proper degrees for maintaining freezer cases when shipping and warehousing the item.

As data is moved through the trading partner's respective application and fed into a main ERP or legacy system, this type of supplemental information becomes critical to the retailer's distribution center's supply chain and warehouse operations. A retailer may even wish to have a requisite field for the name of the Factory Contact as part of the transaction. The retailer needs to establish these types of unique inquiries as an extension of the standards-based transaction. In turn, the manufacturer needs to be able to receive these requirements and input the requisite information to keep the transaction process moving. In order to more efficiently address and close the loop in introducing and distributing a new product the retailer and manufacturer must have the ability to communicate extended data attributes in addition to the standard item attributes.

The same instance prevails with an item's pricing. Standards-based data allows for only one price per unit of measure (e.g. $15 per case; $100 per 100 pounds). However, dependent upon the contract arrangement each retailer may have with the manufacturer, this structured price may be subject to additional discounts by volume, or other specific information as referenced within their individual contract terms such as additional National rates, a specific contract-agreed rate, or even reference to the expiration date of the contract. Items such as these and others would be pertinent extended data for the retailer.

The consumer goods industry revolves around the practice of using promotions to move merchandise. Specifically, a promotion may be defined as the culmination of allowances offered by a manufacturer in order to encourage retailers to buy a certain product(s) within a specified time period. Although planned and initiated by the supply side, it is essentially the input from the retailer dictates the terms of the promotion. When a promotion is planned, many terms are considered, most obvious is the shipment and performance dates of the promotion event, the various merchandising activity to be used, such as a display, gondola end aisle, a "Sunday Supplement" advertisement, a radio or television ad, an in-store flier, or tie-in to a coupon, frequent scanner card, and others. Also relevant is how the retailer is to be paid for performing such promotion, essentially will this offer be in the form of a dollar amount deducted off the product invoice, "off-invoice," or will a fee be charged and billed back to the manufacturer for the amount sold, "bill back." Additionally the retail account may be paid separately for such merchandising activities in the form of a lump sum payment.

Continuing the process, the same need for extended data can be applied to the communication of trade promotions. While discernable information as to performance dates, ship dates, allowance information and the type of merchandising activity planned resident in the standards-based message, other elements such as the designated fund for the promotion, or multiple merchandising and allowance information is absent. Again, these types of extended data attributes are specific to each retailer, and unless the supply side is aware of such sidebar information, promotion deals and incentives would be lost as a result of incomplete data communication. Retailer A may not be able to accept a "Spring Cleaning" promotion for a furniture wax item from Manufacturer B without additional information concerning the designated fund to select for the merchandising activity, or the National Deal it may be tied to, or the Minimal Weekly Sales required.

In order to address the unique parameters of each retailer's operations, extended data attributes about the product, price and promotion must be relayed and tied back into the overall transaction. At present, with most EDI or standards-based XML messages, this information is either not carried through and must be input manually, or it is passed through to a separate database application wherein the data is removed from the context of the original transaction and cannot be matched to the appropriate legacy or ERP system. From the above, it is seen that an improved system for creating and transmitting extended item attributes to product items, pricing and trade promotion transactions is highly required in order to facilitate machine-to-machine collaborative communication without requiring additional dual entry of data at one side of the machine or the other.

SUMMARY OF THE INVENTION

According to the present invention, a technique is provided for improving the flow for information of consumer goods transactions by allowing the user to attach non-standardized extended data attributes to standardized data for publishing product items, pricing and trade promotions in XML-based messages communicated between trading partners. The invention provides a novel interface that establishes the setup for specific database tables to create the desired extended data definitions, thus allowing the respective retailer to individually cater to its own category or business needs. A preferred embodiment of the present invention is the graphical user interface which easily leads the user through the definition process.

The flow of information of the extended data is software-based and is communicated electronically through the Internet as an XML-based message. The present invention is a software application specific to the retailer (demand) and manufacturer (supply) trading partner loaded on their respective network server. The application is Windows-based and communicated through a browser. Each system contains a secure network behind a firewall providing restricted access to the Internet that allows communication to the select trading partners' local network. The respective demand and supply side trading partners must also subscribe to a standards-based organization which provides the designated information and protocol for consumer goods transactions.

When a supply side partner sends a basic transaction, such as an item publication, pricing notation, or presented promotion, to one or many retail (demand) side partners, it may either be in the format of an EDI based transaction set, or an XML-based data message. The electronic message is transmitted through the Internet to the standards-based organization's protocol where the fields of information are verified. If the presented transaction meets the standards-based organization's requisite fields, the message is sent on to the desired recipient (retailer) for action. If it is rejected, or the required data is incomplete, the message is returned to the originating party for correction. Through the present invention's method and system, the retail trading partner is able to retrieve and view that specific transaction in a logical presentation and define extended data pertinent to its business process through a graphical user interface. The present invention also allows for the extended data to reside and travel alongside the basic data, allowing the complete item, pricing or promotion to be more efficiently presented. Once remitted back through to the manufacturer, the extended requirements are assembled for entry on the recipient's end in a reciprocal user interface.

A preferred embodiment of the present invention allows for the retailer's requisite extended data to be transmitted to the desired trading partner. The reciprocal message returned from the manufacturer with the requisite items populated can then be published and integrated to the respective trading partners' ERP or legacy system, such as SAP™, JD Edwards™, PeopleSoft™ and the like. Ultimately, depending on the type of message (item publication, approved promotion), the basic and extended data is then routed to the various accounts payable, invoicing, supply chain and inventory department systems to fully complete the desired transaction.

Numerous advantages are achieved by way of the present invention over conventional techniques. The present invention provides a novel method and system that can be used by one of a plurality of different trading partners. The system uses a software application specific to the retailer that allows extended data attributes to be defined and created specific to the needs of the trading partner as related to the description of the item, its pricing and promotion. Additionally, the invention maintains semblance of the standard and extended data as transmitted through a graphical user interface which keeps both the standard and extended attributes coupled together. These and other advantages or benefits are described throughout the present specification and are described more particularly below and in the attached Figures.

BRIEF DESCRIPTION OF THE DRAWINGS

FIG. 4 illustrates the database tables as related to the Extended Data Format Structure.

FIG. 5 illustrates the graphical user interfaces of the Extended Data Setup and Maintenance.

DETAILED DESCRIPTION OF THE PREFERRED EMBODIMENTS

According to the present invention, a method and system is provided for the establishment of extended data attributes in accompaniment of basic consumer goods transactions between industry trading partners. In an exemplary embodiment, the present invention provides a novel method and system that enhances accurate transmission of information as related to the extended attributes defined and required by the respective trading partners. The entry of the extended data attributes is based in a computer software application for the demand side trading partner or retailer.

Figure 1:
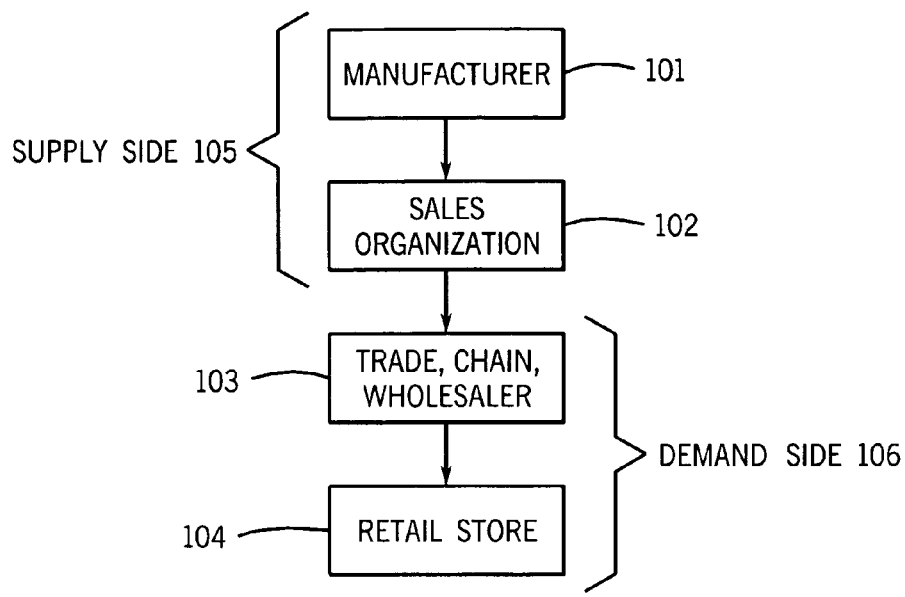
FIG. 1 is a simplified block diagram of the demand and supply trading partners as associated with the consumer goods industry.

In order to better understand the various embodiments of the present invention, an overview of the trading partners is provided. FIG. 1 is a simple diagram of the four entities of the consumer goods industry, and how they are represented as trading partners. This diagram is merely an illustration, which should not limit the scope of the claims herein. Here the reference to "consumer goods" industry would include manufacturers and retailers of various food products, health and beauty products, over the counter drug store items, paper products, cleaning items and other items as used by consumers generally. This may also include durable products such as clothing, music, videos, hardware, and other items found in most mass merchandise stores. The diagram includes a manufacturer of the goods (101), and Sales Organization (102) who are considered Supply Side trading partners (105). In a specific embodiment, the manufacturer is the entity that creates the product or goods from a commodity into a product, subsequently packaging and marketing and selling to the consumer. The next entity is the sales organization (102) which may consist of the manufacturer's own direct sales force, or may be a local agent who is often called a broker. Brokers may be engaged by a number of manufacturers, thus will sell non-competing product lines on a variety of items. For example Broker ABC may represent one manufacturer's brand of furniture wax in the Eastern region; however, that same broker would not represent a similar furniture wax product from a competing manufacturer. The local sales organization is accountable for representing the manufacturer throughout a prescribed market area. The sales organization communicates directly with the trade (103) or demand side partners (106).

The demand-side trading partner (106) is typically thought of as the retailer or buyer—the one purchasing the goods for sale to the end user or consumer. Essentially, this category may be comprised of a chain of stores (e.g. Albertson's, Shaw's, Kroger), or a wholesaler of goods, a company that may buy in bulk and resells to a variety of retail customer accounts. It is through a "one-to-one" relationship and the direct electronic communication between the local sales organization (supply) and the chain or wholesaler (demand), which drives the manufacturer's products down to the retail store (104). It is the retail store, through its affiliation with the chain or wholesaler, who ultimately sells the product to the consumer or end user.

Figure 2:
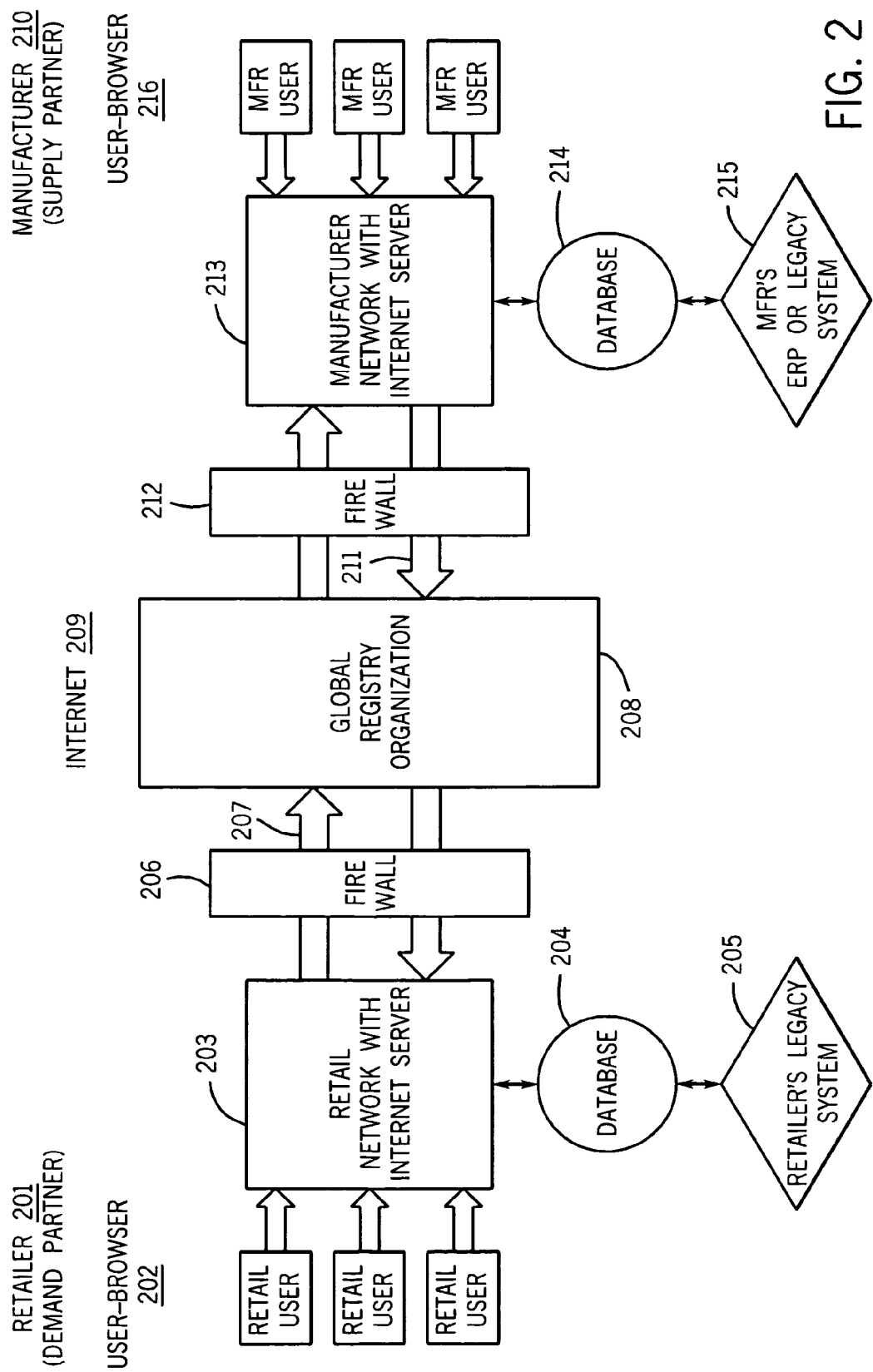
FIG. 2 is a more detailed diagram illustrating computer and networking hardware as according to an embodiment of the present invention.

To associate these partners' activities as related to business-to-business electronic transactions, FIG. 2 provides an overview of the general network configuration. In a specific embodiment, the retailer (201) has individual workstations or computing devices communicating to the server through a browser (202). The computing device can include a personal computer, laptop, or other type of microprocessor device. The retailer's network includes an Internet server (203) wherein the extended data application resides. The network server generally requires a processor such as Intel Pentium™ III Processor of 800 mhz, 256 Mb ram, 10 Gb disk space, a network card, backup device and local network connectivity. The server location may also include a database (204), which stores information therein. The database can be a relational database or any other type of database product made by companies such as Oracle Corporation, Microsoft Corporation, Sybase Inc., or Linux Corporation, but can also be others, depending upon the application. The demand side may also have a legacy system that may house accounts payable/receivable, inventory, warehousing and other departmental operations. XML messages are transmitted to the Internet (209) through a high-speed internet connection such as a T-1 line (207). The global registry organization (208) falls in the middle, receiving incoming messages, parses through the protocols and relays the forwarded message to the desired subscribing trading partner. Each side, supply or demand, also may have a firewall (206, 212) such as Checkpoint's Firewall-1, or other comparable virtual private network encryption box for security measures.

The system is similar on the supply side wherein the manufacturer's users have individual workstations or computing devices communicating to the server through a browser (216). The computing device can include a personal computer, laptop, or other type of microprocessor device. The manufacturer's network includes an Internet server (213) which generally requires a processor such as Intel Pentium™ III Processor of 800 mhz, 256 Mb ram, 10 Gb disk space, a network card, backup device and local network connectivity.

The server location may also include a database (214), which stores information therein. The database can be a relational database or any other type of database product made by companies such as Oracle Corporation, Microsoft Corporation, Sybase Inc., or Linux Corporation, but can also be others, depending upon the application. Depending on the size and complexity of the manufacturer's operations, the manufacturer may have an Enterprise Resource Planning (ERP) system such as those produced by PeopleSoft™, JD Edwards™, and SAP™. Accordingly, messages are also exchanged through the Internet through a designated connection such as a T-1 line or high-speed connection.

Figure 3:
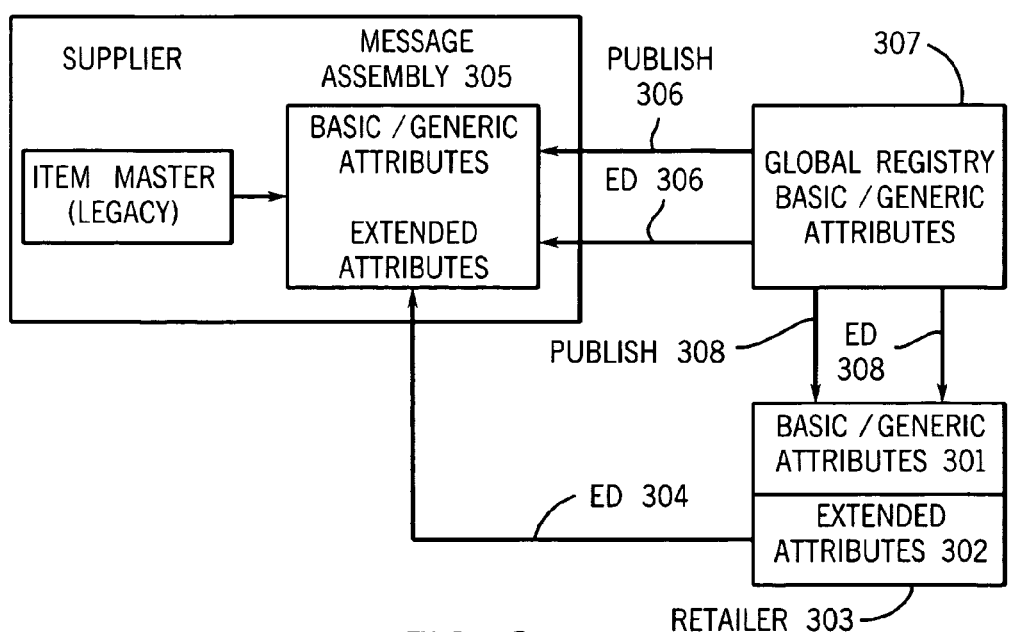
FIG. 3 is a diagram of the process for the Extended Dataflow for an Item.

FIG. 3 is a diagram of the flow of the information, exemplifying generally how the extended data is carried through the transaction and messaging process as related to the consumer goods industry. The diagram FIG. 3 emulates the flow as related to a new item introduction and its publication; however, the same flow and process is utilized for item pricing and promotions as communicated among the three entities (Retailer, Manufacturer and Standards-Based Registry). In order for an item to be included in the electronic communication process and available for distribution and sale, it first needs to be published. This publication is communicated through the standards-based organization and made available to its trading community or subscribers. However, prior to its publication the basic and extended data attributes must be completed. To clarify, basic information is the Item Name, its Category, the GTIN (Global Trade Item Number, a 14-digit identifier for a product at a consumer unit level), Shipping and Order Dates, and the dimensions with respect to the item's Unit of Measure (the defined qualifier for buying, selling or shipping, e.g. case, pound, pallet).

As a preferred embodiment of the present invention, the extended attributes (302), or additional requirements the retailer (303) may have concerning the product are defined and created by the retailer. The retailer then sends the extended data requirements to the manufacturer through an XML-based message (304). The basic data attribute requirements the manufacturer has received from the retailer are populated and assembled, and that standard data is combined with the extended data requirements (305). The item is then published, meaning the manufacturer has received the extended data requirements, completed the requisite fields and then sends an XML message to the standards-based registry (306). The global registry (307) processes the item publication and forwards to the subscribing retail trading partner(s) (308) where it now becomes available for distribution with the correct extended attributes in place.

In order for the retailer to be able to set up and maintain its own extended data, database tables are required to define such attributes. There are four database tables that integrate and provide the foundation for the user to define and input this information. The first table, Extend Definition as illustrated in FIG. 4A, is the metadata of all extended data definitions. It is used for the storage of the Name of the extended data field (401), such as the "Max Temp," and its respective Description (403) "maximum temperature." It also provides for the DataTypeID (402) as characterized by a string, number or date. This table contains a link to the trading partner for which the extended data are defined, and is fully identified by a Global Location Number (GLN) of each trading partner, the EntityTypeID (404) meaning whether an Item, Price, or Promotion, and whether said extended data is to be required from the supply side partner (405).

The second required database table further defines the expected data type for each extended attribute as shown in FIG. 4B. Data types are numeric, a date or simple string. The third table, ExtendEntity type holds the entity types, FIG. 4C. The entity is a generic placeholder that defines the type of objects for which the extended data are defined such as the Product Item, the Price and Promotion.

The fourth table, ExtendValues, FIG. 4D, holds the actual values of the extended data defined in the first ExtendDefinition table. The Values table will contain the extended data definition ID (406), the entity that owns the definition (408) and the data value (407). To illustrate the relationship between the tables, referencing the first row of entries (409), the EntityID is "296"; the DefinitionID "2" which reverting back to the first Extend Definition table is noted as the "Boiling Point." This definition in turn points to an EntityID type as "1," for an Item, which is linked as the unique identifier of the ExtendEntity Type table in FIG. 4C (1=Item). Accordingly, row 1 illustrates that EntityID #296 is actually the ID of a product item with a boiling point of 100° C.

Figure 5B:
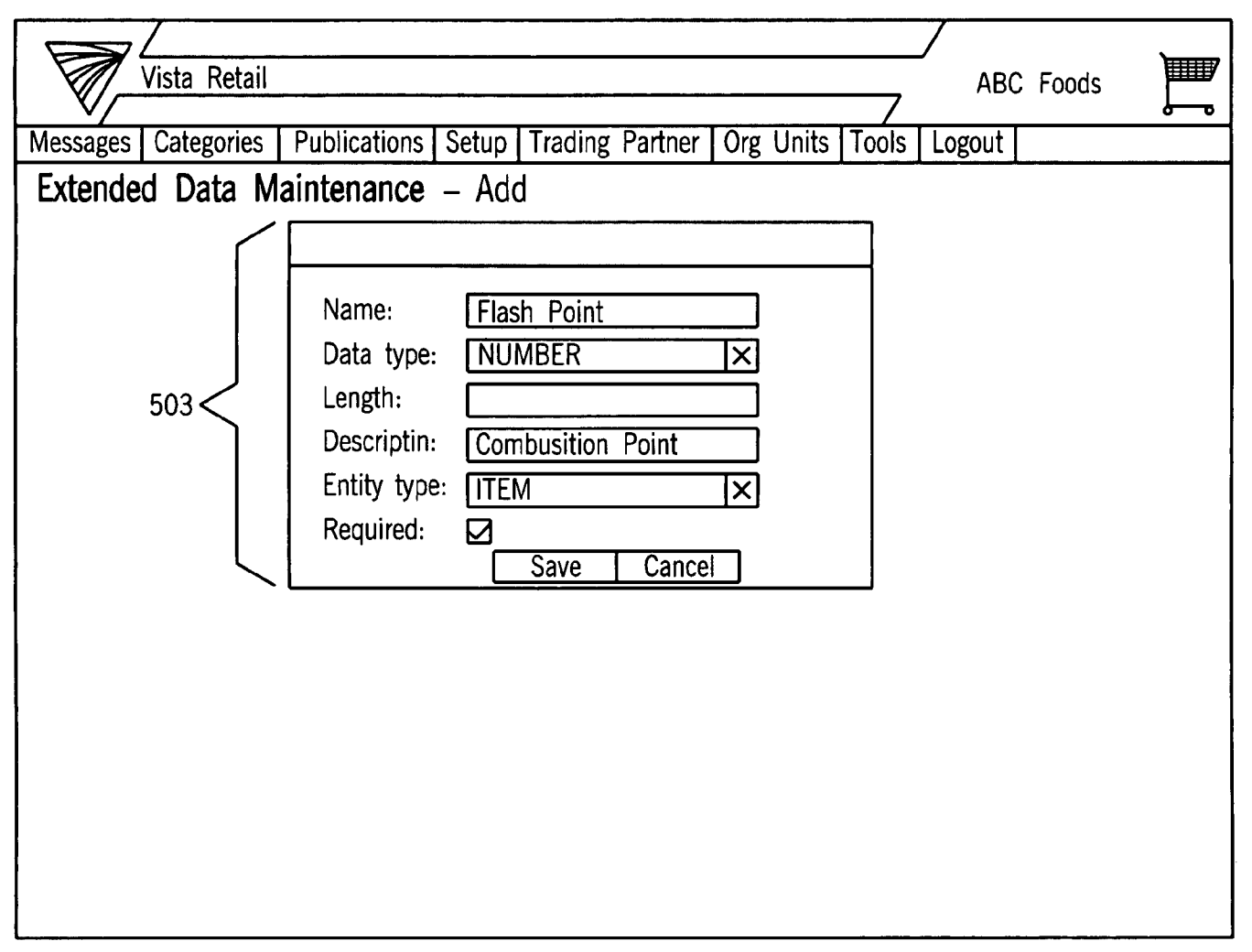

To provide actual data and definitions for the extended attributes, an embodiment of the present invention is accommodated through a front-end graphical user interface. Entry of the desired attribute follows the same method for item, pricing and promotions; however, to best comprehend the process, the examples and Figures shown are related to items. For initial access to the present invention's actual application, the user logs onto the program by way of a user interface with a password and login ID. In this instance of defining extended attributes for an item, the typical user will be a retailer with the appropriate security access through its login permission. As an example, the retailer may be a category buyer for household cleaning products for the chain of ABC Foods. The present invention provides the functionality for creating and maintaining extended custom data about any product item it receives through communicated EDI or XML messages from the standards-based organization of registered items. The graphical user interface is shown in FIG. 5A which the user has accessed by way of the top tab menu option "Setup" (501). By next selecting the "Add New" button (502), a screen appears for defining the desired extended data. In the preferred embodiment, the user has entered the Name as the "Flash Point," the Data Type is provided through a drop down menu option, which in this instance a "Number" is selected. The Description of "Combustion Point," is added, and the Entity Type, also a drop down option, is an "Item," and the table default has indicated this is a required extended attribute per the related Extend Definition table (FIG. 4A).

As related to item pricing, the extended data attribute will again be defined by the retail account. The retail user is essentially requesting the specific terms it deems necessary to process the transaction in addition to the standard price information which may either be one listed price, or dependent on volume, referenced price bracket based on the quantity ordered. What are lacking from the standard price attributes are the additional parameters needed by the retailer's legacy system. In many instances, the retailer and manufacturer may have a separate contract that allows for additional discounts or special considerations with regard to quantities ordered, shipment methods, specific fees and other exceptions. An embodiment of the present invention provides the opportunity for the retailer to query such information through the extended identity type identifier for price. Examples of such price-related extended data may be the effective date of a price bracket, a contract expiration date, a departmental advertising reference number, an aisle location number, or tax id number. Although the extended data fields may be highly varied from retailer to retailer, the fields are generally minimal, but again, prove vital to the transaction as it is passed through to the retailer's own legacy or mainframe system.

Promotions, as mentioned earlier, are the life-stream of the industry. Promotions are planned for items that have been published and have the requisite pricing information. Although the supplier may be the one to actually plan and present the promotion, again, the retailer has definite influence and input as to the terms and parameters thereof, many of which are not part of the standard transaction. Accordingly, the industry standards have allowed for the most basic of data as related to the item, the promotion period, the promotion type, allowances, consumption types, and method of payment for the promotion.

Merchandising activities in and of itself take form in many options, wherein one or any combination may be selected. These include a feature advertisement placed in the store, a display, or the combination of a feature and display, a temporary price reduction, new item introduction special, or an every day low price (EDLP). Continuing as part of the basic data, the allowance amount will be requested to determine whether it is based on an off-invoice, bill back or lump sum payment. Additionally, item attributes will populate as to the consumption types, whether presented by a scanner, in store offer or in ad coupon and accordingly the coupon's value. Here the insertion cost will be presented, or a unit handling fee. Other forecasted items may include a field for the estimated redeemed percentage, thus the percentage of consumers that will receive the said discount. Other standard promotion data is the method of payment, determining whether the retailer will deduct the amount from the product invoice (off invoice), or whether a check will be cut from the field (direct broker contact), or alternatively, will the payment be from the manufacturer's Accounts Payable department. And expectedly, the promotion's order start/end date, its ship start/end date, and performance start/end dates. With all of the above information resident in the standards-based transaction, there are still additional fields required specifically for each retailer in order to facilitate the presented trade deal.

Extended promotion-related attributes might include additional forecasting parameters such as the incremental lift, which is the anticipated consumption amount over and above the base cases resulting from the merchandising activity. There may be a requisite field for a minimum number of sales to be completed weekly, or there could be a tie-in to the manufacturers headquarter deal. Additional fields for a special promotion, which is a promotion tied to two or more different item pack groups. This data and other supplemental information are all relevant to how the retailer will accommodate the deal and ultimately how the promotion will affect its profits.

In continuation of the process and interfaces of the present invention, to make an item available to the trading community and carried out through publication, the retail user retrieves the new item publication from the application's "Publications" tab as denoted in FIG. 6A, (601). The same access would be applicable to the price and presented promotion. From the application's user interface, the various communicated publications come into view (602). Again, the reference here is to an item's published status, thus its availability to the trading community and eligibility for distribution, order and promotional activities. Status designations denote whether the item is "published" or "pending submittal" (603).

FIG. 6B is a representation of the present invention's user interface for creating a new publication. The important information here is for the user to select the appropriate category for the item, which is provided by a drop down menu option. The categories correspond to the hierarchy classification as designated by the appropriate standards organization. The category chosen by the retailer in the example is Chilled/Refrigerated goods (604). The screen example shows where this information has been input manually for the product "Vista Berry Juice." Here the standard item attribute fields are recognized under the Basic tab (605). The top block (606) designates primary information such as the required Global Trade Item Number (GTIN); Universal Product Code (an identification number comprising 12 digits as used to identify the trade item, its manufacturer); and the product name. Continuing on, the next block (607) presents the required dates for first order, first ship, first arrival as well as last order, last ship, and last arrival. The third block of information reflects the ordering information (608). More specifics are obtained through the Dimensions and Unit of Measure (609) fields which provide key information as to how the product is shipped, in what type of pack group (how it is packaged, usually a collection of items of the same size and type); and related, the Size/Unit of Measure such as ounces, pounds which serves as the qualifier for buying, selling or shipping. Additionally, the Pallet Hi, or number of layers high that a product may be stacked height-wise on a standard pallet; and the Pallet Ti or Tier, which is the number of cases that may be layered across.

Figure 6C:
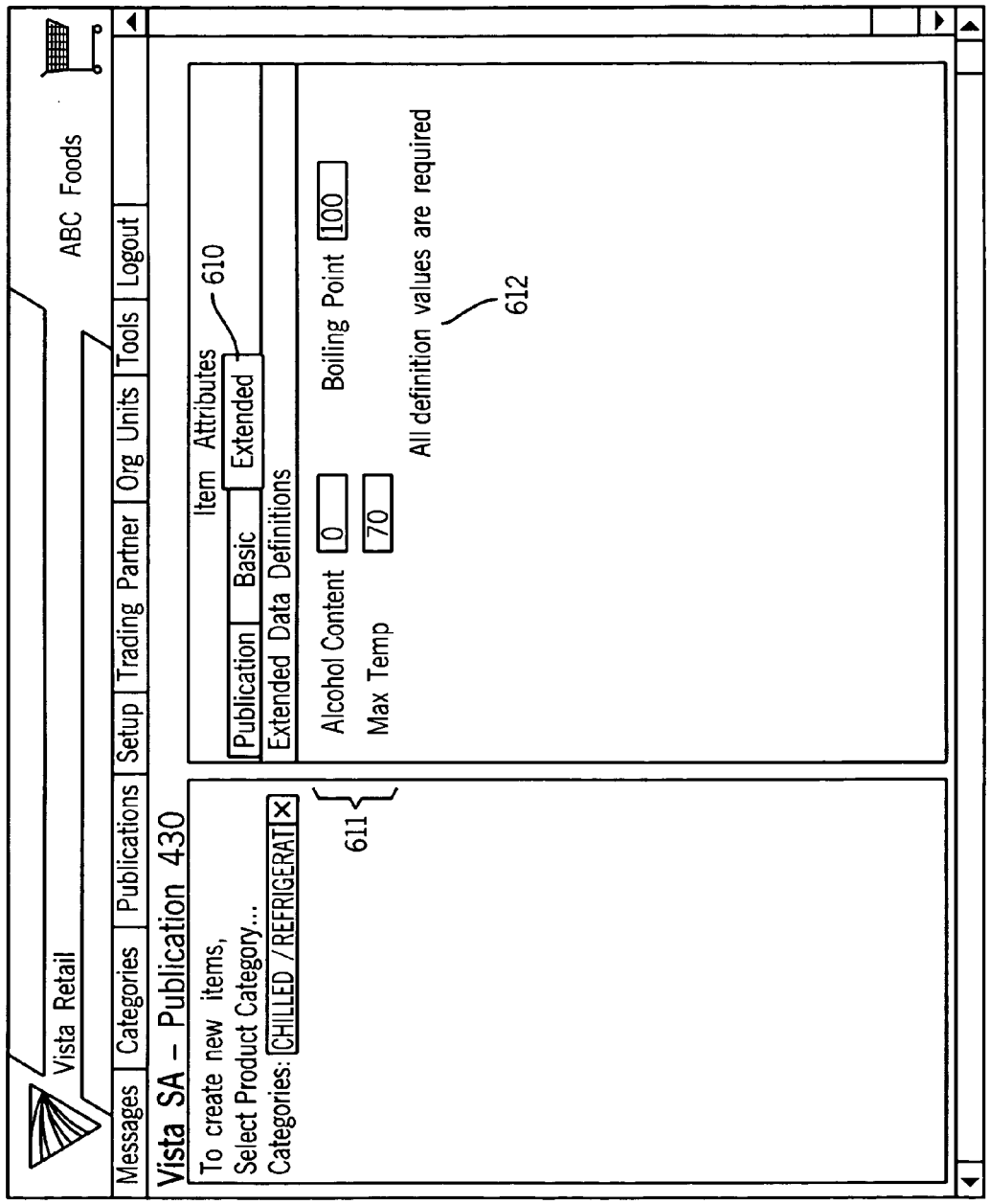
FIG. 6 depicts the graphical user interface of the Item Publication with Basic and Extended Attributes presented.

As shown in the user interface of the present invention, the third tab is related specifically to the extended attributes for the item as shown in FIG. 6C, (610). The information as defined in the Extended Data User Maintenance is relayed to this interface through the associated data tables. The provided definitions for this example are the product's alcohol content; it's boiling point; and maximum temperature (611). It is also noted that all definition values are required for completion (612). This is the end format of what the retailer has established as its extended requisite fields. Respectively, the defined extended data as related to pricing and promotions would appear in a similar format. With the requisite extended data fields defined, this data is then forwarded to the manufacturer for completion and routing to the global registry. By selecting the listed trading partners, the extended data will be sent as an XML-based message through the Internet directly to the manufacturer. The manufacturer, with its reciprocating application, will be notified of a message, retrieve that item, and accordingly input the extended data information. The extended data will remain in tact with the basic data as it is forwarded on to the standards-based organization and made available for subsequent planning/action for the subscribing trading partners.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A computer-based method for electronic communication between consumer goods trading partners, comprising:
   establishing, by a computer, an electronic communication link between first and second trading partners;
   defining, by the computer, user-defined extended data attributes into a plurality of tables through a graphical user interface, the tables including,
   (a) a first table for providing extended data definitions of each extended data attribute, each extended data definition in the first table including an extended data definition identification field, extended data name field, extended data type field, extended data description field, extended entity type field, and unique link to the second trading partner, (b) a second table for correlating each extended data type field used in the first table, the second table including an extended data type field, extended data type name field, and extended data type description field, (c) a third table for correlating each extended entity type used in the first table, the third table including an extended entity type field and extended entity type name field, and d) a fourth table for correlating the extended data definition identification used in the first table, the fourth table including an entity owner of the extended data type definition and values for each extended data attribute;

transmitting, by the computer, standard data attributes to the second trading partner; and transmitting, by the computer, the extended data attributes from the plurality of tables as an XML-message to the second trading partner.

2. The computer-based method of claim 1, wherein the extended data attributes are selected from the group consisting of product, pricing, and trade promotions.

3. The computer-based method of claim 1, wherein defining the user-defined extended data attributes includes using pre-determined security measures to provide authorization for trading partners to input the extended data attributes into the plurality of tables.

4. The computer-based method of claim 1, further including establishing the electronic communication link through the Internet.

5. The computer-based method of claim 1, wherein the unique link to the second trading partner includes a global location number.

6. The computer-based method of claim 5, wherein the extended entity type identification includes a designation for product, price, and promotion.

7. The computer-based method of claim 1, wherein the first table further includes a field to designate whether extended data is required by the second trading partner.

8. The computer-based method of claim 1, wherein the extended data types are numeric, date, and text string.

9. The computer-based method of claim 1, wherein the graphical user interface includes a plurality of data entry screens for creation and maintenance of the extended data attributes as defined in the first, second, third, and fourth tables.

10. A computer-implemented method for electronic communication between trading partners, comprising:

establishing, by a computer, an electronic communication link between first and second trading partners;

transmitting, by the computer, standard data attributes associated with a commercial transaction from the first trading partner to the second trading partner;

defining, by the computer, extended data attributes associated with the commercial transaction in a plurality of tables through a graphical user interface, the tables including, (a) a first table for providing extended data definitions of each extended data attribute, each extended data definition in the first table including an extended data definition identification field, extended data name field, extended data type field, extended data description field, extended entity type field, and unique link to the second trading partner, (b) a second table for correlating each extended data type field used in the first table, the second table including an extended data type field, extended data type name field, and extended data type description field, (c) a third table for correlating each extended entity type used in the first table, the third table including an extended entity type field and extended entity type name field, and (d) a fourth table for correlating the extended data definition identification used in the first table, the fourth table including an entity owner of the extended data type definition and values for each extended data attribute; and transmitting, by the computer, the extended data attributes over the electronic communication link from the first trading partner to the second trading partner.

11. The computer-implemented method of claim 10, wherein the electronic communication link is routed through the Internet.

12. The computer-implemented method of claim 10, wherein the extended entity type identification includes a designation for product, price, and promotion.

13. The computer-implemented method of claim 9, wherein the graphical user interface includes a plurality of data entry screens for creation and maintenance of the extended data attributes as defined in the first, second, third, and fourth tables.

14. The computer-implemented method of claim 10, wherein the extended data attributes relate to product, price, and promotion.

15. The computer-implemented method of claim 10, wherein the extended data attributes are transmitted as XML-based messages.

16. A computer-implemented method for electronic communication between trading partners, comprising:

establishing, by a computer, an electronic communication link between first and second trading partners;

transmitting, by the computer, standard data attributes associated with a commercial transaction from the first trading partner to the second trading partner;

defining, by the computer, extended data attributes associated with the commercial transaction in a plurality of tables through a graphical user interface, the tables including, (a) a first table for providing extended data definitions of each extended data attribute, each extended data definition in the first table including an extended data definition identification field, extended data type field, and extended entity type field, (b) a second table for correlating each extended data type field used in the first table, (c) a third table for correlating each extended entity type used in the first table, and (d) a fourth table for correlating the extended data definition identification used in the first table; and transmitting, by the computer, the extended data attributes over the electronic communication link from the first trading partner to the second trading partner.

17. The computer-implemented method of claim 16, wherein the first table further includes an extended data name field, extended data description field, and unique link to the second trading partner.

18. The computer-implemented method of claim 16, wherein the second table includes an extended data type field, extended data type name field, and extended data type description field.

19. The computer-implemented method of claim 16, wherein the third table includes an extended entity type field and extended entity type name field.

20. The computer-implemented method of claim 16, wherein the fourth table includes an entity owner of the extended data type definition and values for each extended data attribute.

21. The computer-implemented method of claim 16, wherein the graphical user interface includes a plurality of data entry screens for creation and maintenance of the extended data attributes as defined in the first, second, third, and fourth tables.

22. The computer-implemented method of claim 16, wherein the extended data attributes relate to product, price, and promotion.

23. The computer-implemented method of claim 16, wherein the extended data attributes are transmitted as XML-based messages.

\* \* \* \* \*